(12) United States Patent
Kim et al.

(10) Patent No.: US 12,494,156 B2
(45) Date of Patent: Dec. 9, 2025

(54) DATA RECEIVING DEVICE, DATA RECEIVING METHOD, AND DATA COMMUNICATION SYSTEM

(71) Applicant: LX SEMICON CO., LTD., Daejeon (KR)

(72) Inventors: Yoon Geon Kim, Daejeon (KR); Sang Ho Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/587,192

(22) Filed: Feb. 26, 2024

(65) Prior Publication Data

US 2024/0290248 A1 Aug. 29, 2024

(30) Foreign Application Priority Data

Feb. 27, 2023 (KR) ........................ 10-2023-0026151

(51) Int. Cl.
*G09G 3/20* (2006.01)
(52) U.S. Cl.
CPC ..... *G09G 3/2096* (2013.01); *G09G 2330/021* (2013.01); *G09G 2370/00* (2013.01)
(58) Field of Classification Search
CPC .......... G09G 3/2096; G09G 2330/021; G09G 2370/00; G06F 1/32; G06F 1/3296; G06F 13/42
See application file for complete search history.

(56) References Cited

U.S. PATENT DOCUMENTS

| | | | |
|---|---|---|---|
| 10,461,698 B2 * | 10/2019 | Matsumoto | H04B 1/123 |
| 2003/0174762 A1 * | 9/2003 | Schoenborn | H04L 25/028 |
| | | | 375/257 |
| 2005/0088218 A1 * | 4/2005 | Shibata | H04L 25/45 |
| | | | 327/333 |
| 2011/0227641 A1 * | 9/2011 | Weiss | H04L 25/0272 |
| | | | 327/595 |
| 2012/0128091 A1 | 5/2012 | Fountain | |
| 2021/0280113 A1 | 9/2021 | Ahn | |

OTHER PUBLICATIONS

Extended European Search Report issued for the corresponding European patent application No. EP 24152678.9 on Jul. 15, 2024, 11 pages.

\* cited by examiner

*Primary Examiner* — Michael A Faragalla
(74) *Attorney, Agent, or Firm* — ROTHWELL, FIGG, ERNST AND MANBECK, P.C.

(57) ABSTRACT

The present disclosure relates to a data receiving device configured to receive data through a signal line connected to a data transmission device, the data receiving device may include a first circuit configured to process data received through the signal line, a second circuit configured to process a control signal received through the signal line, and a third circuit configured to control a power mode of the first circuit based on the control signal processed by the second circuit, wherein the third circuit may control the first circuit in a low power mode when not receiving the data from the first circuit and control the first circuit in a normal power mode when receiving the control signal from the second circuit.

18 Claims, 8 Drawing Sheets

DATA RECEIVING DEVICE, DATA RECEIVING METHOD, AND DATA COMMUNICATION SYSTEM

CROSS-REFERENCE TO RELATED APPLICATIONS

This application claims priority from Republic of Korea Patent Application No. 10-2023-0026151, filed on Feb. 27, 2023, which is incorporated herein by reference in its entirety.

TECHNICAL FIELD

The present disclosure relates to a data receiving device, a data receiving method, and a data communication system.

BACKGROUND

A display panel may be composed of a plurality of pixels arranged in a matrix form, each pixel may consist of sub-pixels such as a red (R) sub-pixel, a green (G) sub-pixel, a blue (B) sub-pixel, and the like. Each sub-pixel may display an image on the display panel while emitting light in a grayscale corresponding to image data.

The image data may be transmitted from a data processing device which is referred to as a timing controller to a data driving device which is referred to as a source driver. The image data may be transmitted as a digital value, and the data driving device may convert the image data into an analog voltage to drive each sub-pixel.

Since the image data individually or independently indicates a grayscale value of each pixel, as a number of pixels disposed on the display panel increases, an amount of image data increases. In addition, as a frame rate increases, an amount of image data that should be transmitted per unit time increases.

Recently, as resolution of the display panel has been increased, both the number of pixels disposed on the display panel and the frame rate have been increased. Data communication in the display device is becoming faster in order to process the increased amount of image data due to higher resolution.

Meanwhile, during a temporary stream inactivity period during which image data is not transmitted, power consumption may be reduced by inactivating some functions of a receiving circuit or blocking power supplied to the receiving circuit in a receiving side. To implement such a low power mode, in the transmitting side or receiving side, it is possible to transmit a control signal for mode switching to the receiving side or transmitting side. For example, since the control signal for mode switching is a low power pulse signal, the control signal may be sensitive to noise and interference. Therefore, it is necessary to design a receiving circuit capable of effectively receiving the control signal transmitted as the low power pulse signal at the receiving side.

SUMMARY

Technical Problem

Under such a background, an object of the present disclosure is to provide a data receiving device, data receiving method, and data communication system that may effectively receive a transmitted control signal for a low power mode operation when data (e.g., image data) is transmitted from a transmission device to a receiving device.

Technical Solution

In order to achieve the above-described object, according to an embodiment, a data receiving device configured to receive data through a signal line connected to a data transmission device, the data receiving device may include a first circuit configured to process data received through the signal line, a second circuit configured to process a control signal received through the signal line, and a third circuit configured to control a power mode of the first circuit based on the control signal processed by the second circuit, wherein the third circuit may control the first circuit in a low power mode when not receiving the data from the first circuit and control the first circuit in a normal power mode when receiving the control signal from the second circuit.

According to another embodiment, a data receiving method of a data receiving device configured to receive data through a signal line connected to a data transmission device, the data receiving method may include processing data received through the signal line in a first circuit, processing data received through the signal line in a second circuit, and controlling a power mode of the first circuit in a third circuit based on the control signal processed in the second circuit, wherein the controlling of the power mode may control the first circuit in a low power mode when not receiving the data from the first circuit and control the first circuit in a normal power mode when receiving the control signal from the second circuit.

According to still another embodiment, a data communication system may include a data transmission device and a data receiving device connected to the data transmission device through a signal line, wherein the data receiving device may include a first circuit configured to process data received through the signal line, a second circuit configured to process a control signal received through the signal line, and a third circuit configured to control a power mode of the first circuit based on the control signal processed by the second circuit, wherein the third circuit may control the first circuit in a low power mode when not receiving the data from the first circuit and control the first circuit in a normal power mode when receiving the control signal from the second circuit.

Advantageous Effects

As described above, according to the embodiment, it is possible to effectively receive a low power pulse signal by changing a common mode voltage without changing an amplifier design of a receiving circuit configured to receive data transmitted through a differential signal line.

In addition, it is possible to effectively process high-speed data by minimizing parasitic capacitance added on a path of the receiving circuit configured to receive the data transmitted through the differential signal line.

DETAILED DESCRIPTION OF THE EMBODIMENTS

Figure 1:
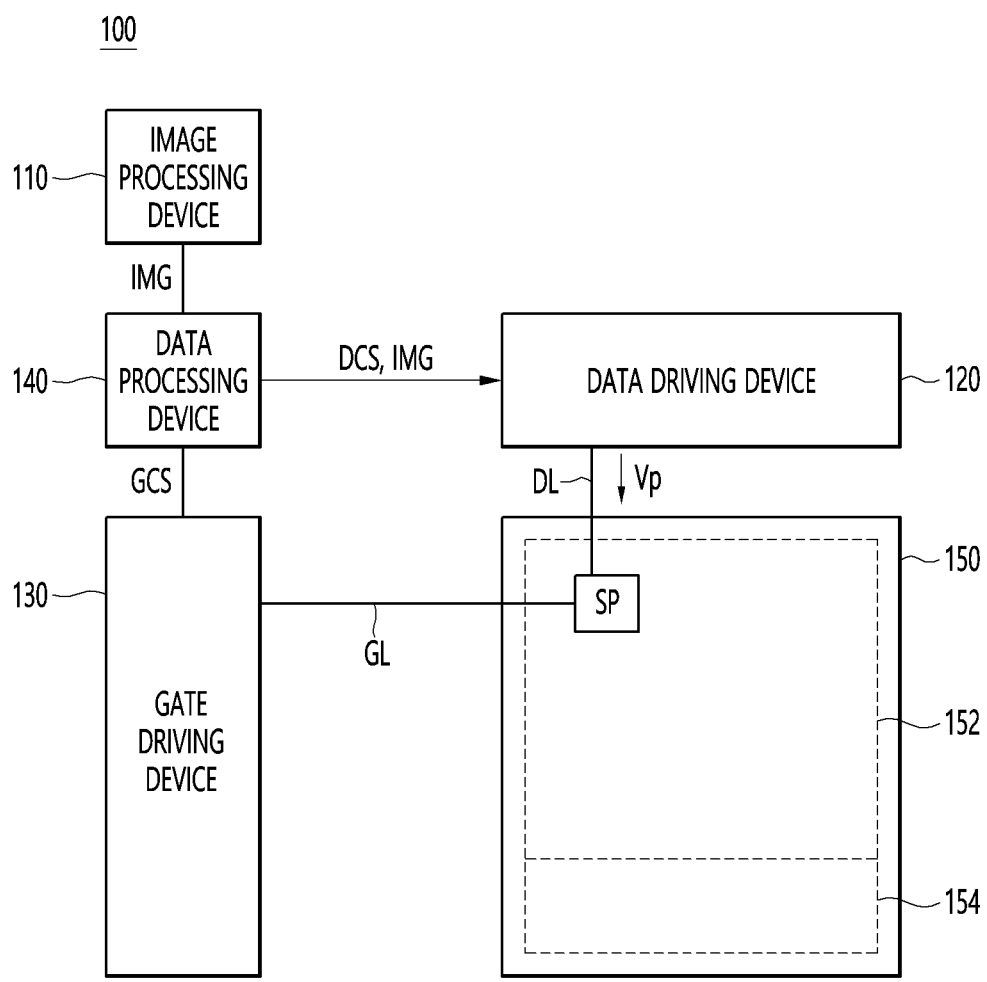
FIG. 1 is a configuration diagram of a display device according to an embodiment.

Hereinafter, embodiments of the present disclosure will be described in detail with reference to the accompanying drawings. In adding reference numerals to elements in each drawing, the same elements will be designated by the same reference numerals as far as possible, although they are shown in different drawings. In addition, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing elements of the present disclosure. These terms are merely used to distinguish one element from other elements, and a property, an order, a sequence or the like of a corresponding element are not limited by the terms. When it is described in the specification that an element is "connected," "coupled" or "joined" to another element, it should be understood that the element may be directly connected, coupled or joined to the other elements, but another element may be "connected," "coupled," and "joined" between the element and other elements.

FIG. 1 is a configuration diagram of a display device according to an embodiment.

Referring to FIG. 1, a display device 100 may include a plurality of panel driving devices (or panel driving circuits) 110, 120, 130, and 140 and a display panel 150.

A plurality of data lines DL and a plurality of gate lines GL may be disposed on the display panel 150, and a plurality of pixels may be disposed on the display panel 150. A pixel P may consist of a plurality of sub-pixels SP. Here, the sub-pixel may be a red (R) sub-pixel, a green (G) sub-pixel, a blue (B) sub-pixel, a white (W) sub-pixel, or the like. One pixel may consist of RGB sub-pixels SP, RGBG sub-pixels SP, RGBW sub-pixels SP, or the like. Hereinafter, for convenience of description, the one pixel will be described as consisting of the RGB sub-pixels.

The panel driving devices (or panel driving circuits) 110, 120, 130, and 140 are devices configured to generate signals for displaying images on the display panel 150 and may include at least one of an image processing device (or image processing circuit) 110, a data driving device (or data driving circuit) 120, a gate driving device (or gate driving circuit) 130, and a data processing device (or data processing circuit) 140.

The gate driving device (or gate driving circuit) 130 may supply a gate driving signal of turn-on voltage or turn-off voltage to the gate line GL. When the gate driving signal of the turn-on voltage is supplied to a sub-pixel SP, the sub-pixel SP may be connected to the data line DL. In addition, when the gate driving signal of the turn-off voltage is supplied to the sub-pixel SP, a connection between the sub-pixel SP and the data line DL may be disconnected. The gate driving device 130 may be referred to as a gate driver.

The data driving device (or data driving circuit) 120 may supply a data voltage Vp to the sub-pixel SP through the data line DL. The data voltage Vp supplied to the data line DL may be supplied to the sub-pixel SP according to the gate driving signal. The data driving device 120 may be referred to as a source driver.

The data driving device 120 may include at least one integrated circuit, where the at least one integrated circuit may be connected to a bonding pad of the display panel 150 in a tape automated bonding (TAB) type or a chip-on-glass (COG) type, directly formed on the display panel 150, and formed to be integrated on the display panel 150 according to an embodiment. In addition, the data driving device 120 may be implemented in a chip-on-film (COF) type.

When the data driving device 120 is formed in the COG type, integrated circuits constituting the data driving device 120 may be formed in a peripheral portion 154 of an active region 152 where the sub-pixel SP is disposed. In order to maximize the active region 152 of the display panel 150, a region of the peripheral portion 154 may be narrowed, and a chip size of the integrated circuits constituting the data driving device 120 may be reduced.

The data processing device (or data processing circuit) 140 may supply a control signal to the gate driving device 130 and the data driving device 120. For example, the data processing device 140 may transmit a gate control signal GCS to initiate a scan to the gate driving device 130. In addition, the data processing device 140 may output image data IMG to the data driving device 120. In addition, the data processing device 140 may transmit a data control signal DCS to control the data driving device 120 to supply the data voltage Vp to each sub-pixel SP. The data processing device 140 may be referred to as a timing controller (or T-CON).

The image processing device 110 may generate the image data IMG to transmit the image data IMG to the data processing device 140. The image processing device 110 may be referred to as a host. For example, the image processing device 110 may include a graphic processing unit (GPU).

The data processing device 140 may include at least one data processing circuit implemented in a form of an integrated circuit, and the data driving device 120 may include at least one data driving circuit implemented in a form of an integrated circuit. A high-speed communication interface may be formed between the data processing circuit and the data driving circuit, and the data processing circuit may transmit the data control signal DCS and/or the image data IMG to the data driving circuit through such a high-speed communication interface.

Figure 2:
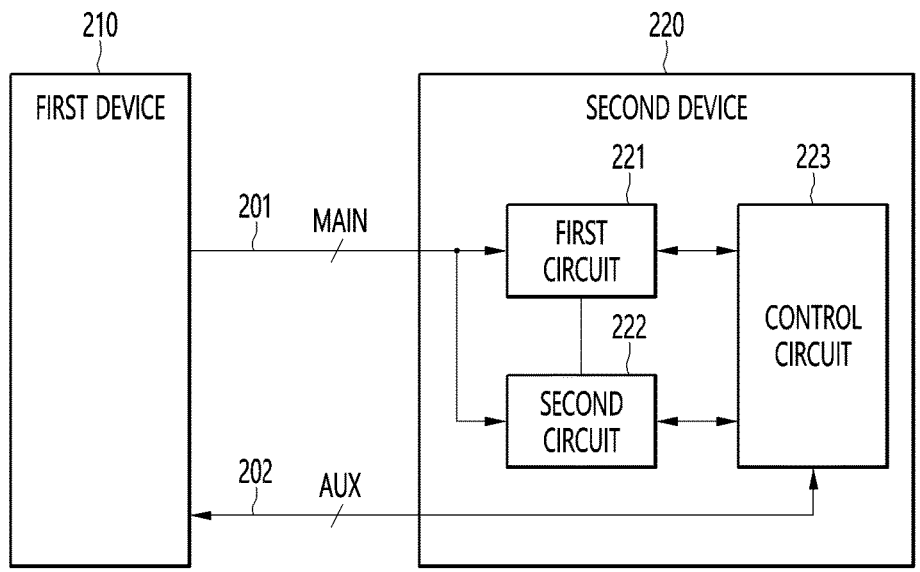
FIG. 2 is a configuration diagram of a data communication system according to an embodiment.

FIG. 2 is a configuration diagram of a data communication system according to an embodiment.

Referring to FIG. 2, the data communication system may include a first device 210 and a second device 220. The first device 210 may transmit data (e.g., image data) to the second device 220 through a main line MAIN 201. The first device 210 may be referred to as a data transmission device, and the second device 220 may be referred to as a data receiving device. The second device 220 may include a first circuit 221, a second circuit 222, and a control circuit 223.

Referring to the above-described FIG. 1 together, according to an embodiment, since image data is transmitted from the image processing device 110 to the data processing device 140, when the image processing device 110 corresponds to the first device 210, the data processing device 140 may correspond to the second device 220. In addition, since the image data is transmitted from the data processing device 140 to the data driving device 120, when the data processing device 140 corresponds to the first device 210, the data driving device 120 may correspond to the second device 220.

According to an embodiment, the first device 210 and the second device 220 may be connected to a plurality of main lines MAIN 201 and at least one auxiliary line AUX 202. In addition, although not shown in FIG. 2, the first device 210 and the second device 220 may be connected to at least one clock line CL. According to an embodiment, when the data is transmitted to include a clock signal through the main line MAIN 201, the clock line CL may be omitted. For example, when the main line MAIN 201 consists of a differential signal and the data is transmitted to include the clock signal through the main line MAIN 201, a signal including the clock signal may be referred to as a clock embedded differential signal CEDS, but embodiments described later are not limited to the above term.

According to an embodiment, an auxiliary signal (or control signal) may be transmitted through the auxiliary line AUX 202. When the auxiliary signal (or control signal) is transmitted through the main line MAIN 201 without a separate auxiliary line AUX, it may be referred to as AUX-less communication, but embodiments described later are not limited to the above term. According to an embodiment, the auxiliary signal (or control signal) may be, for example, a signal indicating a state of the second device 220 (or the first circuit 221). When the auxiliary signal has a first level voltage, the second device 220 may indicate a state in which data may be received. When the auxiliary signal has a second level voltage, the second device 220 may indicate a state in which it is difficult to receive data. Here, the first level and second level voltage may be different voltage levels. The auxiliary signal may be referred to as a lock signal. A phase locked loop (PLL) method may include a process of adjusting a phase of a clock to a communication signal on a side receiving data, and when the phase of the clock is adjusted, the lock signal may be changed. For example, the lock signal may be changed from a low level to a high level or from a high level to a low level.

In an embodiment, the lock signal may be transmitted to the auxiliary line AUX 202. However, here, the lock signal may also indicate another state of the second device 220 in addition to indicating whether the phase of the clock is adjusted. For example, That the lock signal is changed from the high level to the low level may indicate that a state in which it is difficult for the second device 220 to receive the data or indicate that the communication signal is abnormal.

According to an embodiment, a clock pattern may be transmitted to the clock line CL or the main line MAIN 201. For example, the clock pattern may indicate a bit unit of the data transmitted through the main line MAIN (e.g., ML1, ML2, . . . , MLn). The second device 220 may the recognize received data in the bit unit according to the clock pattern. For example, the second device 220 may receive the clock pattern through the main line MAIN 201 and train a communication clock according to the clock pattern. In addition, the second device 220 may receive the data transmitted through the main line MAIN 201 in accordance with the communication clock.

According to an embodiment, the clock line CL may not be used as described above. In this case, the clock pattern may be embedded in the data transmitted through the main line MAIN 201. The clock pattern may be referred to as an embedded clock. According to an embodiment, low voltage and high frequency communication signals may be transmitted from the main line MAIN 201 (or main transmission line). The main line MAIN 201 may be a pair of two lines (e.g., a positive line and a negative line), and the two paired lines may transmit communication signals using a differential signal transmission method.

According to an embodiment, the data (e.g., image data) may be transmitted through the main line MAIN 201. In addition, the data may include information and patterns. For example, setting data, image data, and the like transmitted through the main line MAIN 201 may include information. The setting data may include information about various setting values necessary for an operation of the second device 220, and the image data may include information about a grayscale value of each pixel. The setting data may include the data control signal (see DCS in FIG. 1) described with reference to FIG. 1, and the image data may be the image data (see IMG in FIG. 1) described with reference to FIG. 1.

According to an embodiment, training data (or link data) transmitted through the main line MAIN 201 may be configured to include a set pattern. Here, the pattern may indicate a temporal rule of a signal. The first device 210 and the second device 220 may exchange data without being synchronized with each other due to a delay on the main line MAIN. For transmitting and receiving the data in such an asynchronous state, the second device 220 may train a data link through the training data and receive the setting data or the image data according to the trained data link. The training data (or link data) is primarily transmitted and received for training of the data link, but the training data may be transmitted and received to indicate certain information in an embodiment.

According to an embodiment, the first circuit 221 of the second device 220 may receive the data transmitted through the main line MAIN 201 (e.g., differential signal line) from the first device 210 to process the data. The second circuit 222 of the second device 220 may receive a control signal transmitted from the first device 210 through the main line MAIN 201 (e.g., differential signal line) to process the control signal. The control signal processed by the second circuit 222 of the second device 220 may include a signal for controlling the first circuit 221. For example, the control signal processed by the second circuit 222 of the second device 220 may include a signal for controlling power supplied to the first circuit 221 (e.g., a signal for blocking or reducing power).

According to an embodiment, the control circuit 223 may control the power supplied to the first circuit 221 (e.g., blocks or reduces power) based on the control signal processed through the second circuit 222. According to an embodiment, when the second device 220 receives the data (e.g., image data) transmitted from the first device 210, there may be a temporary stream inactivity period in which the data is not transmitted. The control circuit 223 may block or reduce the power supplied to the first circuit 221 in order to reduce power consumption during the period in which the data is not transmitted. For example, the control circuit 223 may block or reduce the power supplied to the first circuit 221 in order to reduce power consumption during the period in which the data is not transmitted. For example, a mode for blocking or reducing the power supplied to the first circuit 221 may be referred to as a low power mode, but various embodiments are not limited to the above term. The first device 210 may transmit the control signal through the main line MAIN 201 in order to control a mode of the first circuit 221 included in the second device 220. The control signal transmitted through the main line MAIN 201 may be processed in the second circuit 222 of the second device 220. A signal for switching the mode again in order to receive data from the first circuit 221 in a state in which the power supplied to the first circuit 221 is limited may be referred to as a wake-up signal, but various embodiments are not limited to the above term. As the temporary stream inactivity period is entered in a state in which the power is normally supplied to the first circuit 221, a signal for switching to the low power mode may be referred to as a sleep signal, but various embodiments are limited to the above term. In addition, as such, a function of managing power by controlling a mode of the second device 220 configured to receive the data may be referred to as advanced link power management (ALPM), but various embodiments are not limited to the above term.

Figure 3:
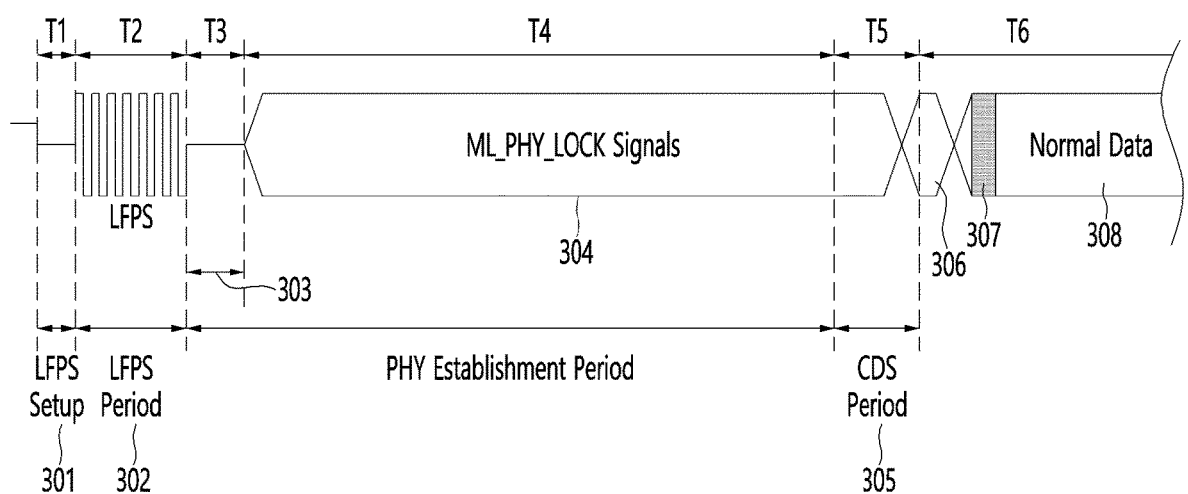
FIG. 3 is a diagram illustrating a waveform of a transmitted signal according to an embodiment.

FIG. 3 is a diagram illustrating a waveform of a transmission signal according to an embodiment.

Referring to FIG. 3, a signal transmitted from the data transmission device (e.g., the first device 210 in FIG. 2) to the data receiving device (e.g., the second device 220 in FIG. 2) may be transmitted through the main line MAIN 201 or the differential signal line. For example, the data transmission device may transmit a control signal for switching a mode in a state in which the circuit for processing the data received from the data receiving device (e.g., the first circuit 221 in FIG. 2) is in the low power mode (e.g., the power supply is blocked or reduced). According to an embodiment, the control signal may be transmitted in a form of a low frequency periodic signaling (LFPS) signal. For example, the control signal may be transmitted in a signal with a frequency (e.g., 50 MHz) lower than a frequency corresponding to a transmission rate (e.g., 2.7 Gbps, 5.4 Gbps, and 8.1 Gbps) of data (e.g., image data) transmitted at relatively high speed.

Referring to FIG. 3, according to an embodiment, a T1 section is an LFPS setup section 301 and may be set to 50 ns to 100 ns. A T2 section is an LFPS section 302 configured to transmit a control signal and may be transmitted as the low frequency periodic signal (LFPS signal) as shown in the drawing. The LFPS signal may be configured to include a set number of pulses (e.g., seven) and may be set to 140 ns to 800 ns. Next, a T3 section is a silence section 303 for physical setting and may be set to 80 ns to 180 ns. When the silence section of T3 has elapsed, a lock signal ML_PHY_LOCK Signals 304 for the main line MAIN may be transmitted in T4 and T5 sections. The lock signal for the main line may be encoded in a set manner (e.g., 8b/10b encoding) and transmitted. The data receiving device (e.g., the second device 220 in FIG. 2) may receive the lock signal for the main line transmitted from the data transmission device (e.g., the first device 210 in FIG. 2), perform clock and data recovery (CDR) based on the lock signal for the main line, and perform equalization operation (EQ). Then, the data transmission device may transmit a clock and data switch CDS signal 305 in the T5 section. Thereafter, the data transmission device may transmit data 308 (e.g., image data) in a T6 section. The data transmission device may additionally transmit an optionally scrambled 8b/10b symbol 306 or the lock signal before transmitting the data. A scrambler reset SR signal 307 may be transmitted to a start portion of the data 308.

Referring to FIG. 2 together, when the first circuit 221 of the second device 220 operates in the low power mode and may not receive the data, the second circuit 222 of the second device 220 may process the control signal (e.g., LFPS signal) received from the first device 210 through the main line MAIN 201. The control signal processed in the second circuit 222 may be transmitted to the control circuit 223. The control circuit 223 may wake up the first circuit 221 based on the control signal (e.g., LFPS signal) processed through the second circuit 222. For example, the control circuit 223 may control so as to be a state in which the first circuit 221 may receive and process the data by supplying normal power to the first circuit 221 in the low power mode. According to an embodiment, the control signal (e.g., LFPS signal) processed in the second circuit 222 may be configured as a low power pulse signal. The low power pulse signal may be sensitive to noise and interference. Therefore, a received signal detection threshold V_LFPS_RX_DETECT_TH value may be set in advance such that the control signal may be normally processed in the second circuit 222. The received signal detection threshold value may be defined in an eDP v1.5 standard document, and various embodiments are not limited thereto. For example, according to the standard document, the received signal detection threshold value may be set to 100 mVp-p as a minimum value and 300 mVp-p as a maximum value. Examples described later are explained in consideration of values defined in the standard document, but the embodiments are not limited thereto.

Figure 4:
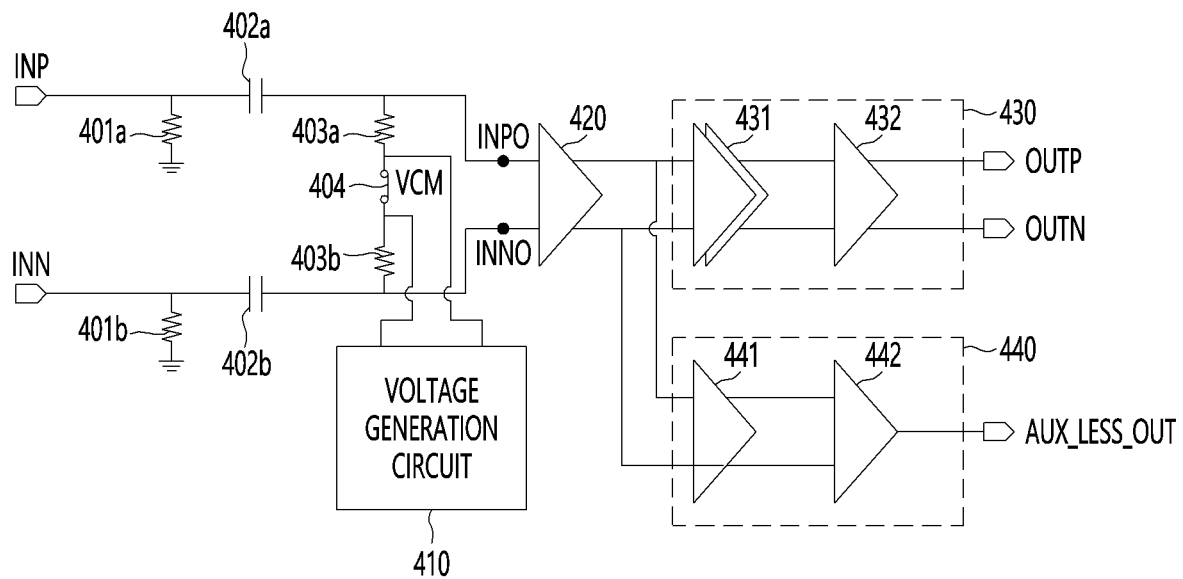
FIG. 4 is a circuit diagram of a data receiving device according to an embodiment.

FIG. 4 is a circuit diagram of a data receiving device according to an embodiment.

Referring to FIG. 4, the data receiving device (e.g., the second device 220) may include first resistors 401a and 401b, second resistors 403a and 403b, capacitors 402a and 402b, a switch 404, a receiving amplifier RX AMP 420 (or a receiving buffer), a first circuit 430, and a second circuit 440. According to an embodiment, the data receiving device (e.g., the second device 220) may receive a signal transmitted through a positive line of a differential signal line through a positive port (INP) and may receive a signal transmitted through a negative line of the differential signal line through a negative port (INN). For example, the signal transmitted through the differential signal line may be input to a reception amplifier 420. The capacitors 402a and 402b for alternative current (AC) coupling may be added between the positive port (INP) and negative port (INN) and an input terminal of the reception amplifier 420, respectively. The first resistors 401a and 401b may be connected in parallel between the positive port (INP) and negative port (INN) and the capacitors 402a and 402b, respectively. According to an embodiment, the positive line and the negative line may be connected to the second resistors 403a and 403b. A common mode voltage VCM may be applied between the second resistors 403a and 403b. The common mode voltage VCM may be supplied between the second resistors 403a and 403b by a voltage generation circuit 410.

According to an embodiment, data received through the differential signal line may be amplified through the reception amplifier 420 and then input to the first circuit 430. The first circuit 430 may include a two-stage continuous time linear equalizer CTLE 431 and a first CMOS buffer 432, but the embodiments are not limited thereto. The two-stage CTLE 431 may remove unnecessary frequency components from the received data. The first CMOS buffer 432 may output the received data as a CMOS level signal.

According to an embodiment, the control signal received through the differential signal line may be amplified through the reception amplifier 420 and then input to the second circuit 440. As described above, the first circuit 430 may be controlled in the low power mode during a time section in which the data receiving device receives the control signal. The second circuit 440 may include a first stage current mode logic CML 441 and a second CMOS buffer 442. According to an embodiment, the first stage CML 441 may process a received control signal in a form of the low power pulse signal to output control data. The second CMOS buffer 442 may output the control data output from the first stage CML 441 as the CMOS level signal. Referring again to FIG. 2, the control circuit 223 may control the first circuit 221 to be changed from the low power mode to the normal mode based on the control signal processed through the second circuit 222 (e.g., the second circuit 440 in FIG. 4). For example, the control circuit 223 may receive and process data by normally supplying power to the first circuit 221 (e.g., the first circuit 430 in FIG. 4) according to the mode change.

Figure 5:
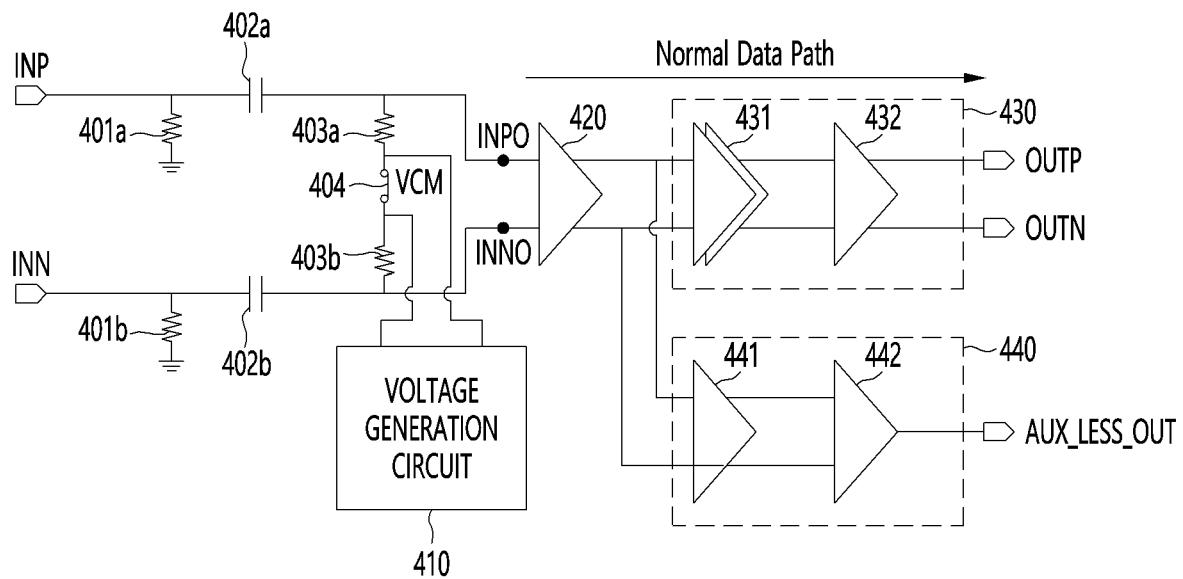
FIG. 5 is a circuit diagram of a data receiving device according to an embodiment.

FIG. 5 is a circuit diagram of a data receiving device according to an embodiment.

Referring to FIG. 5, the data receiving device may process data received through the first circuit 430 in a first time section (e.g., normal mode period) in which data (e.g., image data) is received. For example, the first time section may correspond to the T6 section in FIG. 3. The first circuit 430 may receive normally power to operate normally.

According to an embodiment, the switch 404 included in the data receiving device may be controlled to be in an on-state, and the voltage generation circuit 410 may supply the common mode voltage VCM between the second resistors 403a and 403b (e.g., 0.75V). According to an embodiment, the first circuit 430 may check transmitted data (e.g., image data) by a voltage difference between the positive signal and the negative signal based on the supplied common mode voltage VCM.

Figure 6:
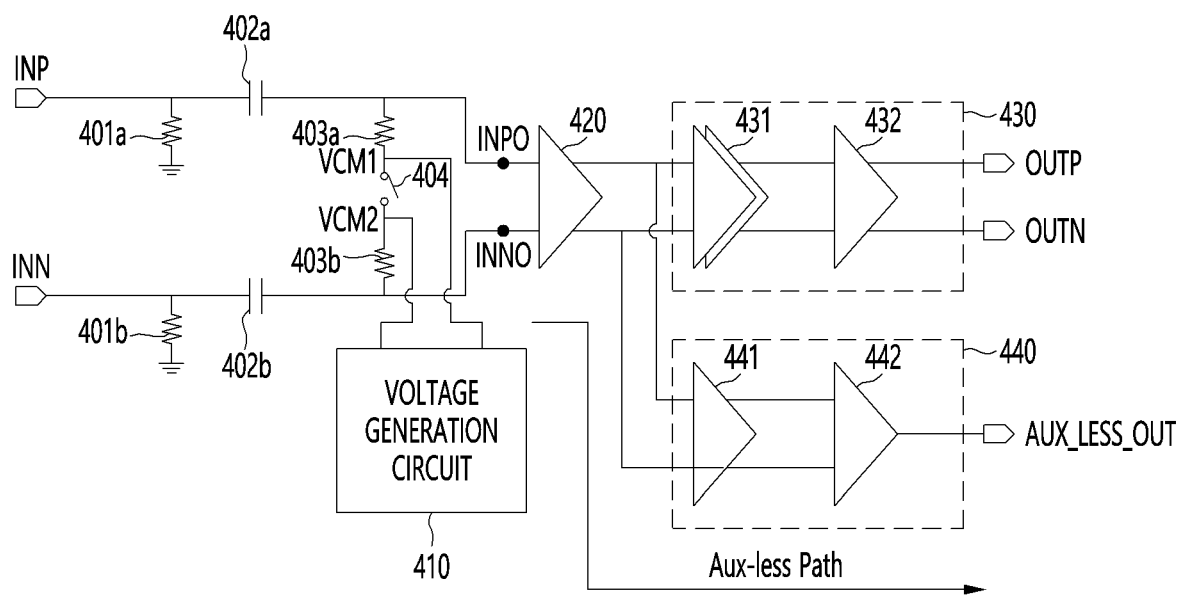
FIG. 6 is a circuit diagram of a data receiving device according to an embodiment.

FIG. 6 is a circuit diagram of a data receiving device according to an embodiment.

Referring to FIG. 6, the data receiving device may process a control signal received through the second circuit 440 in a second time section (e.g., low power mode section) in which the control signal (e.g., LFPS signal) is received. For example, the second time section may correspond to the T2 section in FIG. 3. At this time, the first circuit 430 may operate in a low power mode. The low power mode may include a mode in which the supply of power is controlled to be limited or blocked by the first circuit 430 or any component included in the first circuit 430.

According to an embodiment, the switch 404 included in the data receiving device may be controlled to be in an off-state, and the voltage generation circuit 410 may supply different common mode voltages VCM to the positive line and the negative line. For example, a first common mode voltage VCM1 (e.g., 0.75V) may be supplied to the second resistor 403a connected to the positive line, and a second common mode voltage VCM2 (e.g., 0.65V) may be supplied to the second resistor 403b connected to the negative line. According to an embodiment, the second circuit 440 may normally process the received control signal (e.g., LFPS signal) based on the differently supplied common mode voltages VCM1 and VCM2.

Figure 7:
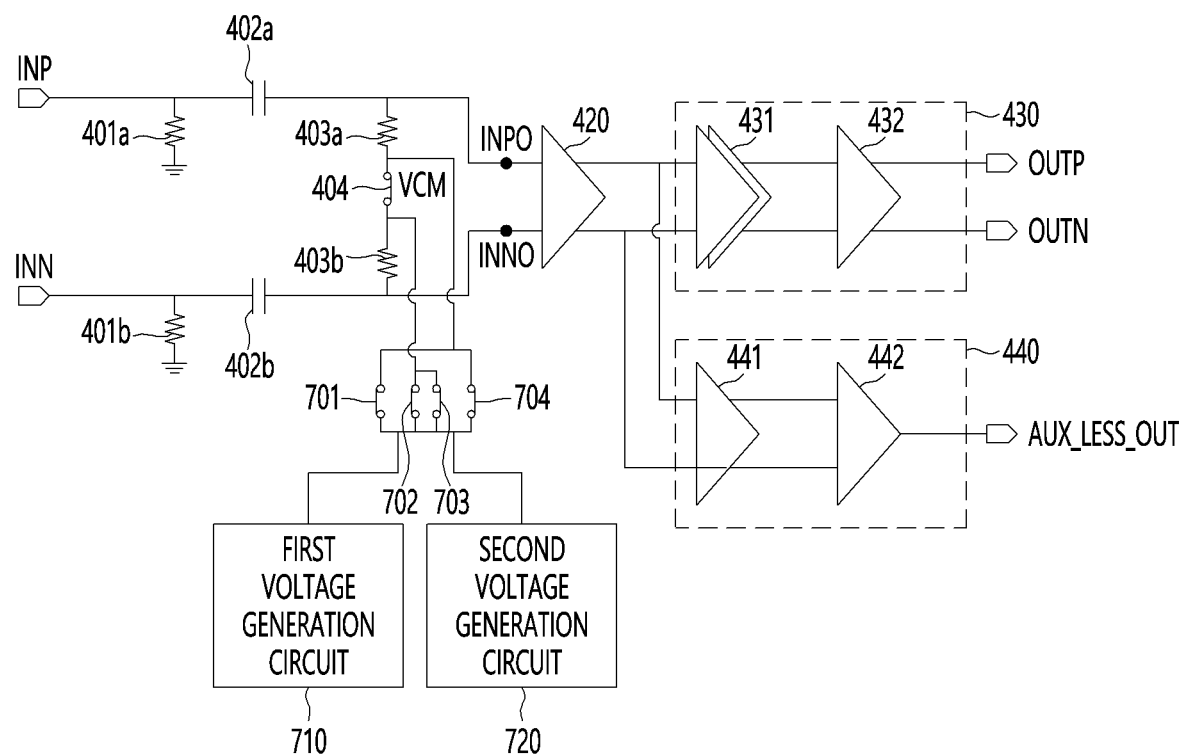
FIG. 7 is a circuit diagram of a data receiving device according to an embodiment.

FIG. 7 is a circuit diagram of a data receiving device according to an embodiment.

Referring to FIG. 7, the voltage generation circuit 410 in FIG. 4 may include a first voltage generation circuit 710 and a second voltage generation circuit 720 to generate different common mode voltages. The first voltage generation circuit 710 and the second voltage generation circuit 720 may be connected between the second resistors 403a and 403b by switches (first switch 701, second switch 702, third switch 703, and fourth switch 704). For example, as shown in FIG. 5, in the first time section in which the data (e.g., image data) is received, only one of the first voltage generation circuit 710 and the second voltage generation circuit 720 may be connected between the second resistors 403a and 403b such that the same common mode voltage may be applied to the positive line and negative line. On the other hand, as shown in FIG. 6, in the second time section in which the control signal (e.g., LFPS signal) is received, the first voltage generation circuit 710 may be connected to the second resistor 403a connected to the positive line to supply the first common mode voltage VCM1 to the positive line, and the second voltage generating circuit 720 may be connected to the second resistor 403b connected to the negative line to supply the second common mode voltage VCM2 to the negative line. Hereinafter, the operation will be described in more detail with reference to FIGS. 8A and 8B.

Figure 8A:
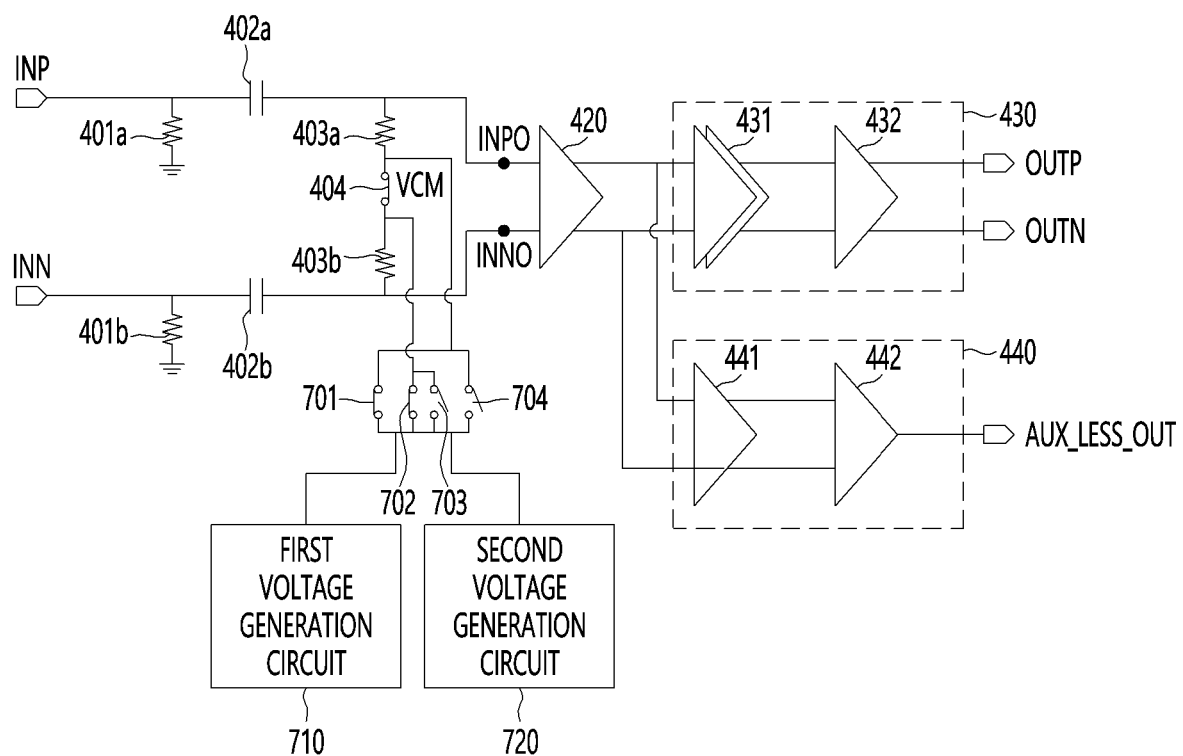
FIG. 8A is a circuit diagram of a data receiving device according to an embodiment.
Figure 8B:
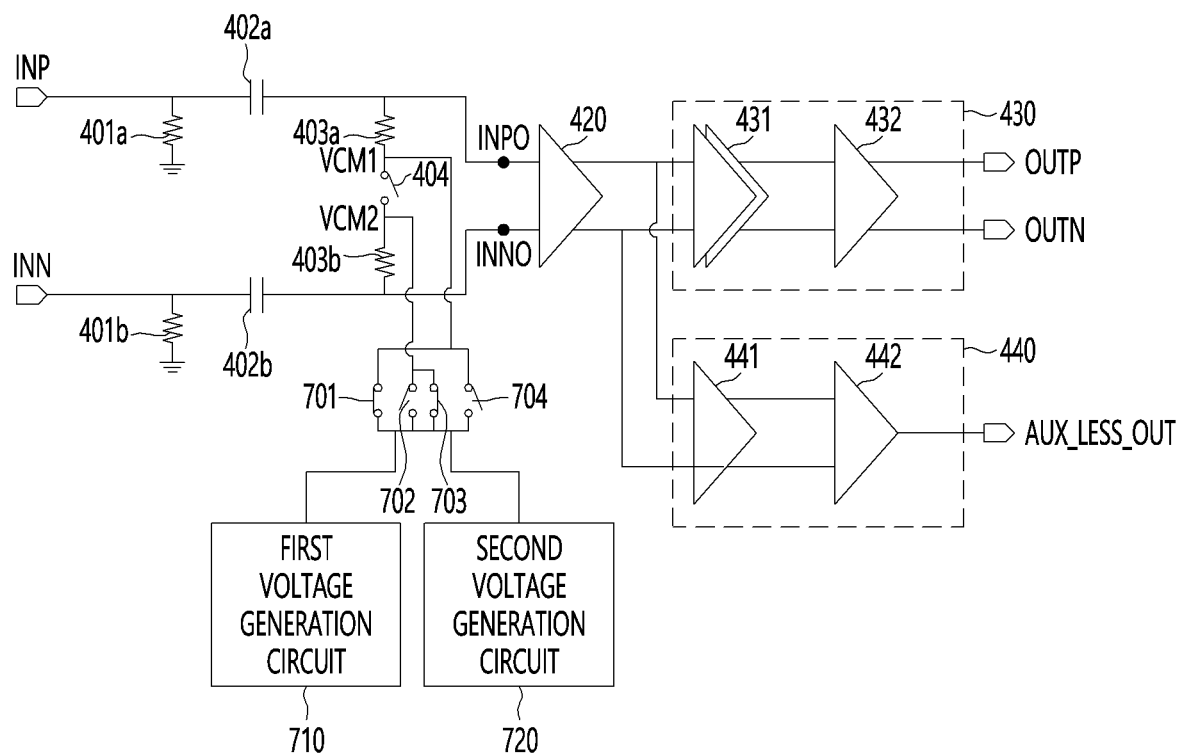
FIG. 8B is a circuit diagram of a data receiving device according to an embodiment.

FIG. 8A is a circuit diagram in a normal mode section of a data receiving device according to an embodiment, and FIG. 8B is a circuit diagram in a low power mode section of a data receiving device according to an embodiment.

Referring to FIG. 8A, according to an embodiment, the data receiving device may control the first switch 701 and the second switch 702 to be in an on-state and control the third switch 703 and the fourth switch 704 to be in an off-state in the first time section (e.g., normal mode section). The data receiving device may control the switch 404 connecting between the differential signal lines to be in the on-state. As the switches are controlled as shown in FIG. 8A, the first voltage generation circuit 710 may be connected between the differential signal lines, and the second voltage generation circuit 720 may not be connected therebetween. Accordingly, the first voltage generation circuit 710 may supply the common mode voltage VCM (e.g., 0.75V) between the second resistors 403a and 403b. According to an embodiment, the first circuit 430 may check transmitted data (e.g., image data) by a voltage difference between the positive signal and the negative signal based on the supplied common mode voltage VCM.

Referring to FIG. 8B, according to an embodiment, the data receiving device may control the first switch 701 and the third switch 703 to be in the on-state and control the second switch 702 and the fourth switch 704 to be in the off-state in the second time section (e.g., low power mode section). The data receiving device may control the switch 404 connecting between the differential signal lines to be in the off-state. As the switches are controlled as shown in FIG. 8B, the first voltage generation circuit 710 and the second voltage generation circuit 720 may supply different common mode voltages VCM1 and VCM2 to the positive line and negative line, respectively. For example, the first common mode voltage VCM1 (e.g., 0.75V) may be supplied to the second resistor 403a connected to the positive line by the first voltage generation circuit 710, and the second common mode voltage VCM2 (e.g., 0.65V) may be supplied to the second resistor 403b connected to the negative line by the second voltage generation circuit 720. According to an embodiment, the second circuit 440 may normally process the received control signal (e.g., LFPS signal) based on the differently supplied common mode voltages VCM1 and VCM2.

Figure 9:
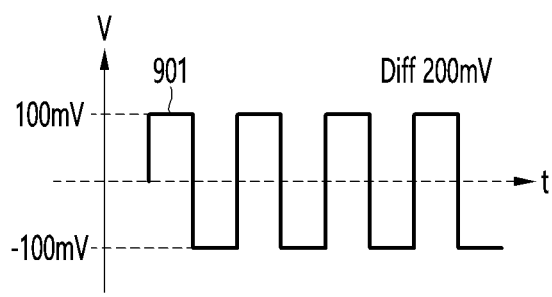
FIG. 9 is a diagram illustrating a difference between differential signals according to an embodiment.

FIG. 9 is a diagram illustrating a difference between differential signals according to an embodiment.

Referring to FIG. 9, a difference between signals transmitted through the positive and negative lines of the differential signal line may be a pulse-shaped signal 901 swinging between +100 mV and −100 mV.

Figure 10:
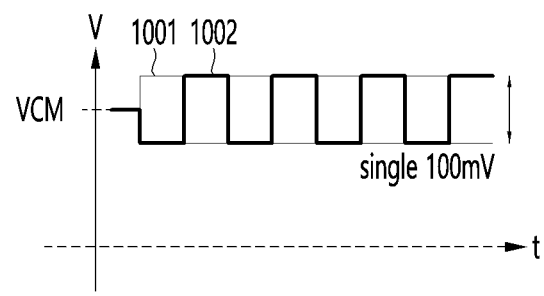
FIG. 10 is a diagram illustrating a waveform of a received signal according to an embodiment.

FIG. 10 is a diagram illustrating a waveform of a received signal according to an embodiment.

Referring to FIG. 10, as described above in FIG. 5, as the common mode voltage VCM is applied between the positive line and the negative line, a signal 1001 received through the positive line and a signal 1002 received through the negative line may represent a pulse shape swinging based on the VCM, respectively. At this time, a peak-to-peak value of the signal 1001 received through the positive line may be 100 mV, and a peak-to-peak value of the signal 1002 received through the negative line may also be 100 mV. According to an embodiment, as described above in the description of FIG. 8A, in the first time section (e.g., normal mode period), the first circuit 430 may check data (e.g., image data) transmitted by a voltage difference between the signal 1001 received through the positive line and the signal 1002 received through the negative line based on the common mode voltage VCM.

Figure 11:
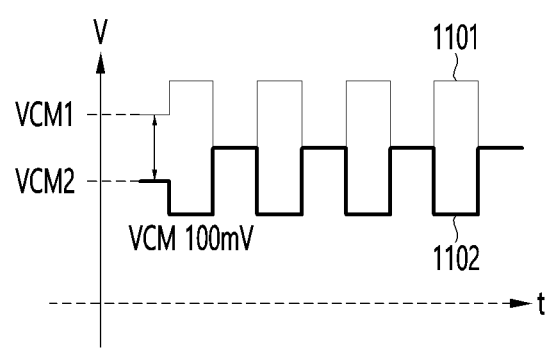
FIG. 11 is a diagram illustrating a waveform of a received signal according to an embodiment.

FIG. 11 is a diagram illustrating a waveform of a received signal according to an embodiment.

Referring to FIG. 11, as described above in FIG. 6, the different common mode voltages VCM1 and VCM2 may be applied to the positive and negative lines, respectively. For example, the first common mode voltage VCM1 may be applied to a common mode voltage of a signal 1101 received through the positive line, and the second common mode voltage VCM2 may be applied to a common mode voltage of a signal 1102 received through the negative line. Compared to FIG. 10, the signal 1101 received through the positive line and the signal 1102 received through the negative line may be widened by a difference between the common mode voltages VCM1 and VCM2 as shown in FIG. 11. For example, when the first common mode voltage VCM1 is 0.75V and the second common mode voltage VCM2 is 0.65V, the difference between the two common mode voltages may be 100 mV. At this time, the signal 1101 received through the positive line and the signal 1102 received through the negative line are signals transmitted simultaneously through the differential signal line and have a complementary relationship with each other, and thus a voltage difference between the two signals may be 0 mV~200 mV. According to an embodiment, assuming that the second circuit 222 outputs "0" when the difference between the two signals is positive (+) and outputs "1" when the difference is negative (−), the signal may be normally checked like the pulses in FIG. 10 are 0, 1, 0, 1, . . . . On the other hand, when the peak-to-peak of the signal 1101 received through the positive line or the signal 1102 received through the negative line is less than 100 mV, the signal 1101 received through the positive line always has a value greater than that of the signal 1102 received through the negative line, and thus the signal received from the second circuit 222 may be blocked. For example, considering that the received signal detection threshold value is set to 100 mVp-p as the minimum value according to the eDP 1.5v standard document, references of the standard document may be satisfied by setting the common mode voltage differently as described above. For example, the references of the standard document may be satisfied by setting the common mode voltage such that the difference between the first common mode voltage VCM1 and the second common mode voltage VCM2 is 100 mV or more in the low power mode section.

According to various embodiments, as described above, the low power pulse signal (e.g., LFPS signal) may be effectively received by changing the common mode voltage without changing the amplifier design of the receiving circuit configured to receive the data transmitted through the differential signal line. In addition, the high-speed data may be processed effectively by minimizing parasitic caps added to the path of the receiving circuit configured to receive the data transmitted through the differential signal line.

What is claimed is:

1. A data receiving device configured to receive data through a signal line connected to a data transmission device, the data receiving device comprising:
a first circuit configured to process the data received through the signal line;
a second circuit configured to process a control signal received through the signal line; and
a third circuit configured to control a power mode of the first circuit based on the control signal processed by the second circuit,
wherein the third circuit is configured to control the first circuit in a low power mode as a result of not receiving the data from the first circuit, and control the first circuit in a normal power mode as a result of receiving the control signal from the second circuit,
wherein the signal line connected to the first circuit and the second circuit includes a differential signal line including a positive line and a negative line,
wherein the third circuit is configured to apply a same common mode voltage to the positive line and the negative line by turning on a switch connected directly between the positive line and the negative line in the normal power mode, and apply a first common mode voltage to the positive line and a second common mode voltage different from the first common mode voltage to the negative line by turning off the switch in the low power mode, and
wherein the switch is not connected to a ground and is configured to electrically short or open the positive line and the negative line directly depending on the power modes.

2. The data receiving device of claim 1, wherein, when controlling the first circuit in the low power mode during a period in which the third circuit is not receiving the data from the first circuit, the third circuit is configured to perform the low power mode to block or reduce power supply to the first circuit, and
when controlling the first circuit in the normal power mode based on the control signal processed by the second circuit, the third circuit is configured to perform the normal power mode to normally supply power to the first circuit.

3. The data receiving device of claim 1, wherein a peak-to-peak value of a signal received through the positive line and a peak-to-peak value of a signal received through the negative line by the same common mode voltage each represent a pulse shape swinging based on the same common mode voltage.

4. The data receiving device of claim 1, wherein the switch is controlled to be open when the first common mode voltage is applied to the positive line and the second common mode voltage is applied to the negative line.

5. The data receiving device of claim 1, wherein the switch is controlled to be in a short-circuited state when the same common mode voltage is applied to the positive line and the negative line.

6. The data receiving device of claim 1, wherein the first common mode voltage is greater than the second common mode voltage, and
a difference value between the first common mode voltage and the second common mode voltage is a preset value or greater than the preset value.

7. The data receiving device of claim 6, wherein the preset value is 100.

8. The data receiving device of claim 1, wherein the first circuit is configured to process data received through the differential signal line including the positive line and the negative line in a first time section, and
the second circuit is configured to process a control signal received through the differential signal line including the positive line and the negative line in a second time section.

9. The data receiving device of claim 8, wherein the third circuit is configured to apply the same common mode voltage to the positive line and the negative line in the first time section, and
apply a third common mode voltage to the positive line and a fourth common mode voltage different from the third common mode voltage to the negative line in the second time section.

10. The data receiving device of claim 8, wherein the third circuit includes a voltage generation circuit that is respectively connected to a first node between the positive line and one side of the switch and a second node between the negative line and the other side of the switch to apply the same common mode voltage.

11. The data receiving device of claim 10, wherein, when the switch is controlled to be in a short-circuited state in the first time section, the voltage generation circuit is configured to apply the same common mode voltage to the positive line and the negative line, and
when the switch is controlled to be open, the voltage generation circuit is configured to apply a third common mode voltage to the positive line and apply a fourth common mode voltage different from the third common mode voltage to the negative line in the second time section.

12. The data receiving device of claim 1, wherein the data is transmitted as a signal corresponding to a first frequency, and
the control signal is transmitted as a signal corresponding to a second frequency lower than the first frequency.

13. A data receiving method for a data receiving device configured to receive data through a signal line connected to a data transmission device, the data receiving method comprising:
processing the data received through the signal line in a first circuit;
processing a control signal received through the signal line in a second circuit;
controlling a power mode of the first circuit in a third circuit based on the control signal processed in the second circuit,
wherein the controlling of the power mode of the first circuit includes controlling the first circuit in a low power mode as a result of not receiving the data from the first circuit and controlling the first circuit in a normal power mode as a result of receiving the control signal from the second circuit, and
wherein the signal line connected to the first circuit and the second circuit includes a differential signal line including a positive line and a negative line; and
applying in the third circuit a same common mode voltage to the positive line and the negative line by turning on a switch connected directly between the positive line and the negative line in the normal power mode, and applying in the third circuit a first common mode voltage to the positive line and a second common mode voltage different from the first common mode voltage to the negative line by turning off the switch in the low power mode,
wherein the switch is not connected to a ground and is configured to electrically short or open the positive line and the negative line directly depending on the power modes.

14. The data receiving method of claim 13, wherein the controlling of the first circuit in the low power mode includes performing a low power mode to block or reduce power supply to the first circuit during a period in which the third circuit is not receiving the data from the first circuit, and
the controlling of the first circuit in the normal power mode includes performing the normal power mode of normally supplying power to the first circuit based on the control signal processed by the second circuit.

15. The data receiving method of claim 13, wherein a peak-to-peak value of a signal received through the positive line and a peak-to-peak value of a signal received through the negative line by the same common mode voltage each represent a pulse shape swinging based on the same common mode voltage.

16. The data receiving method of claim 15, wherein the controlling of the power mode of the first circuit includes applying the same common mode voltage to the positive line and the negative line in a first time section and
applying a third common mode voltage to the positive line and applying a fourth common mode voltage different from the third common mode voltage to the negative line in a second time section.

17. A data communication system comprising:
a data transmission device; and
a data receiving device connected to the data transmission device through a signal line,
wherein the data receiving device includes:
a first circuit configured to process data received through the signal line;
a second circuit configured to process a control signal received through the signal line; and
a third circuit configured to control a power mode of the first circuit based on the control signal processed by the second circuit,
wherein the third circuit is configured to control the first circuit in a low power mode as a result of not receiving the data from the first circuit and control the first circuit in a normal power mode as a result of receiving the control signal from the second circuit,
wherein the signal line connected to the first circuit and the second circuit includes a differential signal line including a positive line and a negative line,
wherein the third circuit is configured to apply a same common mode voltage to the positive line and the negative line by turning on a switch connected directly between the positive line and the negative line in the normal power mode, and apply a first common mode voltage to the positive line and a second common mode voltage different from the first common mode voltage to the negative line by turning off the switch in the low power mode, and wherein the switch is not connected to a ground and is configured to electrically short or open the positive line and the negative line directly depending on the power modes.

18. The data communication system of claim 17, wherein a peak-to-peak value of a signal received through the positive line and a peak-to-peak value of a signal received through the negative line by the same common mode voltage each represent a pulse shape swinging based on the same common mode voltage.

\* \* \* \* \*